(12) United States Patent
Lin et al.

(10) Patent No.: US 11,692,572 B2
(45) Date of Patent: Jul. 4, 2023

(54) JOINT FOR ABOVE GROUND POOL FRAME

(71) Applicant: Intex Marketing Ltd., Tortola (VG)

(72) Inventors: Hua Hsiang Lin, Fujian (CN); Yaw Yuan Hsu, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 16/220,484

(22) PCT Filed: Jun. 16, 2017

(86) PCT No.: PCT/US2017/037892
§ 371 (c)(1),
(2) Date: Dec. 14, 2018

(87) PCT Pub. No.: WO2017/218904
PCT Pub. Date: Dec. 21, 2017

(65) Prior Publication Data
US 2019/0178275 A1 Jun. 13, 2019

(30) Foreign Application Priority Data

Jun. 17, 2016 (CN) .......................... 201620598406.9
Jun. 22, 2016 (CN) .......................... 201630270359.0
Sep. 6, 2016 (CN) .......................... 201621039473.3

(51) Int. Cl.
*F16B 7/14* (2006.01)
*E04H 4/00* (2006.01)
(Continued)

(52) U.S. Cl.
CPC .............. *F16B 7/14* (2013.01); *A63C 19/02* (2013.01); *E04H 4/0056* (2013.01); *E04H 4/14* (2013.01); *F16B 7/042* (2013.01); *F16B 7/0446* (2013.01)

(58) Field of Classification Search
CPC ................................. F16B 7/17; E04H 4/0056
(Continued)

(56) References Cited

U.S. PATENT DOCUMENTS 1,786,613 A 12/1930 Hooper
1,884,410 A 10/1932 Mncent
(Continued)

FOREIGN PATENT DOCUMENTS

CL 201502321 8/2015
CN 2195595 Y 4/1995
(Continued)

OTHER PUBLICATIONS

International Search Report and Written Opinion dated Aug. 24, 2017 in corresponding international Application No. PCT/US2017/037892.
(Continued)

*Primary Examiner* — Lauren A Crane
(74) *Attorney, Agent, or Firm* — Faegre Drinker Biddle & Reath LLP

(57) ABSTRACT

A frame pool is disclosed including a frame assembly and a pool liner, the frame assembly including horizontal frame members and a vertical frame member coupled together via a T-shaped joint. The T-shaped joint may be constructed of plastic to facilitate attachment and detachment to the adjacent frame members and to resist galling and corrosion. The T-shaped joint may also be relatively small to improve the appearance and water containment of the frame pool.

29 Claims, 4 Drawing Sheets

(51) Int. Cl.
  *F16B 7/04* (2006.01)
  *A63C 19/02* (2006.01)
  *E04H 4/14* (2006.01)
(58) Field of Classification Search
  USPC .................................................. 4/654, 506
  See application file for complete search history.

(56) References Cited

U.S. PATENT DOCUMENTS

| | | | |
|---|---|---|---|
| D174,950 S | 6/1955 | Fishberg | |
| 3,225,362 A | 12/1965 | Barrera | |
| 3,424,178 A | 1/1969 | Yazaki | |
| 3,595,180 A | 7/1971 | Swoyer | |
| 3,654,640 A | 4/1972 | Katzman | |
| 3,864,048 A | 2/1975 | Parker | |
| 3,874,132 A | 4/1975 | Mendelow | |
| 3,877,491 A | 4/1975 | Thastrup | |
| 4,323,319 A | 4/1982 | Adams | |
| 4,356,933 A | 11/1982 | Connolly | |
| D304,486 S | 11/1989 | Elder et al. | |
| 4,890,343 A | 1/1990 | Schlags | |
| 5,054,135 A | 10/1991 | Dallaire et al. | |
| 5,083,327 A | 1/1992 | Gillebaard | |
| 5,143,476 A * | 9/1992 | Pruis ............ | F16B 7/042 403/108 |
| D343,889 S | 2/1994 | Stonecypher | |
| D348,723 S | 7/1994 | Carroll | |
| D361,847 S | 8/1995 | Cetrulo | |
| 5,927,363 A | 7/1999 | Olsen | |
| D417,918 S | 12/1999 | Mussa | |
| D420,145 S | 2/2000 | Mussa | |
| D420,146 S | 2/2000 | Mussa | |
| 6,079,894 A * | 6/2000 | Obitts ............ | A61H 3/02 135/75 |
| 6,272,696 B1 | 8/2001 | Sobel et al. | |
| D453,553 S | 2/2002 | Maerz | |
| D454,205 S | 3/2002 | Spicer | |
| D454,940 S | 3/2002 | Hoenig | |
| D455,950 S | 4/2002 | Unwin et al. | |
| 6,477,721 B2 | 11/2002 | Lee | |
| D472,648 S | 4/2003 | Linsley | |
| 6,595,713 B1 | 7/2003 | Wilson | |
| 6,604,250 B1 | 8/2003 | Lee | |
| D481,110 S | 10/2003 | Snyder et al. | |
| D495,434 S | 8/2004 | Cooper | |
| 6,803,007 B2 | 10/2004 | Meggiolan | |
| D504,523 S | 4/2005 | Gimpel | |
| D567,394 S | 4/2008 | Pena | |
| D580,530 S | 11/2008 | McAlpine | |
| D592,492 S | 5/2009 | Werschmidt | |
| D599,446 S | 9/2009 | Price et al. | |
| D626,405 S | 11/2010 | Goad | |
| D654,353 S | 2/2012 | Tabler | |
| D676,942 S | 2/2013 | Kluss et al. | |
| D707,366 S | 6/2014 | Rowland | |
| D718,853 S | 12/2014 | Lee | |
| D755,940 S | 5/2016 | Schulze | |
| D759,889 S | 6/2016 | Seehof | |
| D760,425 S | 6/2016 | Seehof | |
| D770,599 S | 11/2016 | Daughters | |
| D771,779 S | 11/2016 | Scifres et al. | |
| D805,165 S | 12/2017 | Dean et al. | |
| D815,300 S | 4/2018 | Lin et al. | |
| D874,021 S | 1/2020 | Huang et al. | |
| D900,286 S | 10/2020 | Daughters | |
| D905,832 S | 12/2020 | Gray | |
| D908,849 S | 1/2021 | Decaria | |
| D925,011 S | 7/2021 | Parihar | |
| D926,295 S | 7/2021 | Zhang | |
| D930,802 S | 9/2021 | Huang et al. | |
| D945,871 S | 3/2022 | MacDonald | |
| 2001/0037620 A1 | 11/2001 | Choi | |
| 2002/0042948 A1 * | 4/2002 | Lee ............ | E04H 4/0056 4/506 |
| 2002/0064420 A1 | 5/2002 | Lin | |
| 2003/0001387 A1 | 1/2003 | Tawara | |
| 2004/0118844 A1 * | 6/2004 | Bennett ......... | B65D 90/205 220/4.12 |
| 2007/0068584 A1 | 3/2007 | Murdock et al. | |
| 2008/0314466 A1 | 12/2008 | Cimberio et al. | |
| 2009/0144892 A1 | 6/2009 | Brindle | |
| 2009/0205121 A1 * | 8/2009 | Cheng ............ | E04H 4/0056 4/506 |
| 2010/0083437 A1 | 4/2010 | Hui | |
| 2014/0325751 A1 * | 11/2014 | Hake ............ | A47K 3/06 4/585 |
| 2015/0115186 A1 | 4/2015 | Borland et al. | |
| 2016/0201348 A1 | 7/2016 | Liu | |
| 2016/0215513 A1 * | 7/2016 | Liu ............ | E04H 4/0056 |
| 2016/0222686 A1 * | 8/2016 | Liu ............ | E04H 4/0056 |
| 2017/0089085 A1 | 3/2017 | Liu | |
| 2017/0356206 A1 | 12/2017 | Huang | |
| 2019/0032796 A1 | 1/2019 | Di Monte | |
| 2020/0141143 A1 | 5/2020 | Huang et al. | |
| 2020/0332544 A1 | 10/2020 | Huang et al. | |
| 2021/0324648 A1 | 10/2021 | Huang et al. | |
| 2021/0348409 A1 | 11/2021 | Chen et al. | |
| 2022/0034113 A1 | 2/2022 | Huang et al. | |
| 2022/0275661 A1 | 9/2022 | Huang et al. | |

FOREIGN PATENT DOCUMENTS

| | | |
|---|---|---|
| CN | 2480479 Y | 3/2002 |
| CN | 2766083 | 3/2006 |
| CN | 200968073 | 10/2007 |
| CN | 201487444 | 5/2010 |
| CN | 101787807 A | 7/2010 |
| CN | 202745430 U | 2/2013 |
| CN | 204475913 U | 7/2015 |
| CN | 204475914 | 7/2015 |
| CN | 204531509 | 8/2015 |
| CN | 205777703 | 12/2016 |
| CN | 206054469 U | 3/2017 |
| CN | 206477627 U | 9/2017 |
| CN | 207673066 U | 7/2018 |
| CN | 209040623 | 6/2019 |
| CN | 209130364 U | 7/2019 |
| DE | 8810857 U1 | 10/1988 |
| DE | 9104915 U1 | 8/1991 |
| DE | 19904335 A1 | 8/1999 |
| FR | 2774416 A1 | 8/1999 |
| GB | 2349412 | 11/2000 |
| RU | 9029 U1 | 1/1999 |
| RU | 009029 U1 | 1/1999 |
| RU | 28886 | 4/2003 |
| RU | 178000 U1 | 3/2018 |
| WO | 2017/218904 | 12/2017 |

OTHER PUBLICATIONS

Intex, Ultra Frame Pool Owner's Manual, May 13, 2015, 17 pages.
Intex, 2013 Above Ground Pools Catalogue, Copyright 2012, 13 pages.
http://hardware-store-online.com/berater/intex-ultra-frame-pool-horizontal-beam#more-infos Retrieved Jul. 31, 2017.
Best Way https://www.amazon.com/Steel-Pro-Frame-Pool-Set/dp/B00HZAM07U/ref=sr_1_24?dchild=1&keywords=above+ground+frame+pool&qid=1605540738&sr=8-24 (Year: 2017).
International Preliminary Report on Patentability received for PCT Patent Application No. PCT/IB2019/057831, dated Mar. 25, 2021, 7 pages.
International Search Report and Written Opinion received for PCT Patent Application No. PCT/IB2019/057831, dated Dec. 20, 2019, 9 pages.
Killife Pool Cart https://www.amazon.com/KITLIFE-Storage-Resistant-Cracking-Included/dp/B08B46LM5N/ (Year: 2018).
Summer https://www.amazon.com/Summer-Waves-Premium-Swimming-Accessory/dp/B07BXC85HG/ (Year: 2018).
European Search Report for EP Patent Application No. 19862486.8, dated Apr. 26, 2022, 7 pages.

(56) References Cited

OTHER PUBLICATIONS

Plumbingsupply.Com, "Incredible Selection of PVC Fittings, Sch. 40 PVC fillings and Sch.80 PVC Adapters," The Wayback Machine—https://web.archive.org/web/20180701150048/https://www.plumbingsupply.com, (Copyrights) 1995-2018 PlumbingSupply.com, 127 pages.

Non-Final Office Action, issued by the U.S. Patent and Trademark Office, dated Aug. 4, 2022, for U.S. Appl. No. 17/276,885; 10 pages.

Response to Non-Final Office Action, issued by the U.S. Patent and Trademark Office, dated Nov. 3, 2022, for U.S. Appl. No. 17/276,885; 8 pages.

Non-Final Office Action, issued by the U.S. Patent and Trademark Office, dated Dec. 20, 2022, for U.S. Appl. No. 17/962,979; 12 pages.

Response to Non-Final Office Action, filed with the U.S. Patent and Trademark Office, dated Mar. 20, 2023, for U.S. Appl. No. 17/962,979; 11 pages.

Final Office Action, issued by the U.S. Patent and Trademark Office, dated Apr. 3, 2023, for U.S. Appl. No. 17/962,979; 7 pages.

Response to Final Office Action, filed with the U.S. Patent and Trademark Office, dated Apr. 3, 2023, for U.S. Appl. No. 17/962,979; 7 pages.

\* cited by examiner

JOINT FOR ABOVE GROUND POOL FRAME

CROSS REFERENCE TO RELATED APPLICATIONS

The present application claims priority to the following Chinese patent applications, the disclosures of which are hereby expressly incorporated by reference herein in their entirety:

| Application No. | Filing Date |
| --- | --- |
| CN 201620598406.9 | Jun. 17, 2016 |
| CN 201630270359.0 | Jun. 22, 2016 |
| CN 201621039473.3 | Sep. 6, 2016 |

FIELD OF THE DISCLOSURE

The present disclosure relates to an above ground pool. More particularly, the present disclosure relates to a joint for an above ground pool, and to a method for using the same.

BACKGROUND OF THE DISCLOSURE

A frame pool may include a frame assembly and a pool liner supported by the frame assembly to form a water cavity of the pool. The frame assembly may include one or more horizontal frame members (e.g., horizontal pipes) that form an upper rim of the pool and one or more vertical frame members (e.g., vertical pipes) that extend downward from the horizontal frame members to the ground. To allow the frame assembly to be disassembled for storage and assembled for use, the horizontal frame members and the vertical frame members may be removably coupled together via a plurality of T-shaped joints. Existing T-shaped joints are formed of metal, which may be susceptible to galling and corrosion, especially as any protective coating on the metal becomes worn or damaged. Also, existing T-shaped joints are relatively wide, so existing pool liners may require wide holes or gaps to accommodate such T-shaped joints, which may impact the pool's appearance and ability to contain water.

SUMMARY

The present disclosure provides a frame pool including a frame assembly and a pool liner, the frame assembly including horizontal frame members and a vertical frame member coupled together via a T-shaped joint. The T-shaped joint may be constructed of plastic to facilitate attachment and detachment to the adjacent frame members and to resist galling and corrosion. The T-shaped joint may also be relatively small to improve the appearance and water containment of the frame pool.

According to an embodiment of the present disclosure, a frame joint is disclosed for an above ground pool frame having a first horizontal frame member, a second horizontal frame member, and a vertical frame member. The frame joint includes: a first horizontal joint portion including a first coupling assembly configured to couple with the first horizontal frame member; a second horizontal joint portion including a second coupling assembly configured to couple with the second horizontal frame member; and a vertical joint portion fixedly coupled to the first and second horizontal joint portions and configured to couple with the vertical frame member; wherein a width of the vertical joint portion accounts for at least 50% of a width between the first and second coupling assemblies of the first and second horizontal joint portions.

According to another embodiment of the present disclosure, a frame joint is disclosed for an above ground pool frame having a first horizontal frame member, a second horizontal frame member, and a vertical frame member. The frame joint includes: a first horizontal joint portion configured to couple with the first horizontal frame member, the first horizontal joint portion being constructed of plastic; a second horizontal joint portion configured to couple with the second horizontal frame member, the second horizontal joint portion being constructed of plastic; and a vertical joint portion fixedly coupled to the first and second horizontal joint portions and configured to couple with the vertical frame member, the vertical joint portion being constructed of plastic.

According to yet another embodiment of the present disclosure, a method is disclosed for assembling an above ground pool. The method includes: coupling a first horizontal joint portion of a frame joint to a first horizontal frame member with a first coupling assembly; coupling a second horizontal joint portion of the frame joint to a second horizontal frame member with a second coupling assembly; and coupling a vertical joint portion of the frame joint to a vertical frame member, wherein a width of the vertical joint portion accounts for a majority of a width between the first and second coupling assemblies of the first and second horizontal joint portions.

BRIEF DESCRIPTION OF THE DRAWINGS

The above-mentioned and other features and advantages of this disclosure, and the manner of attaining them, will become more apparent and will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
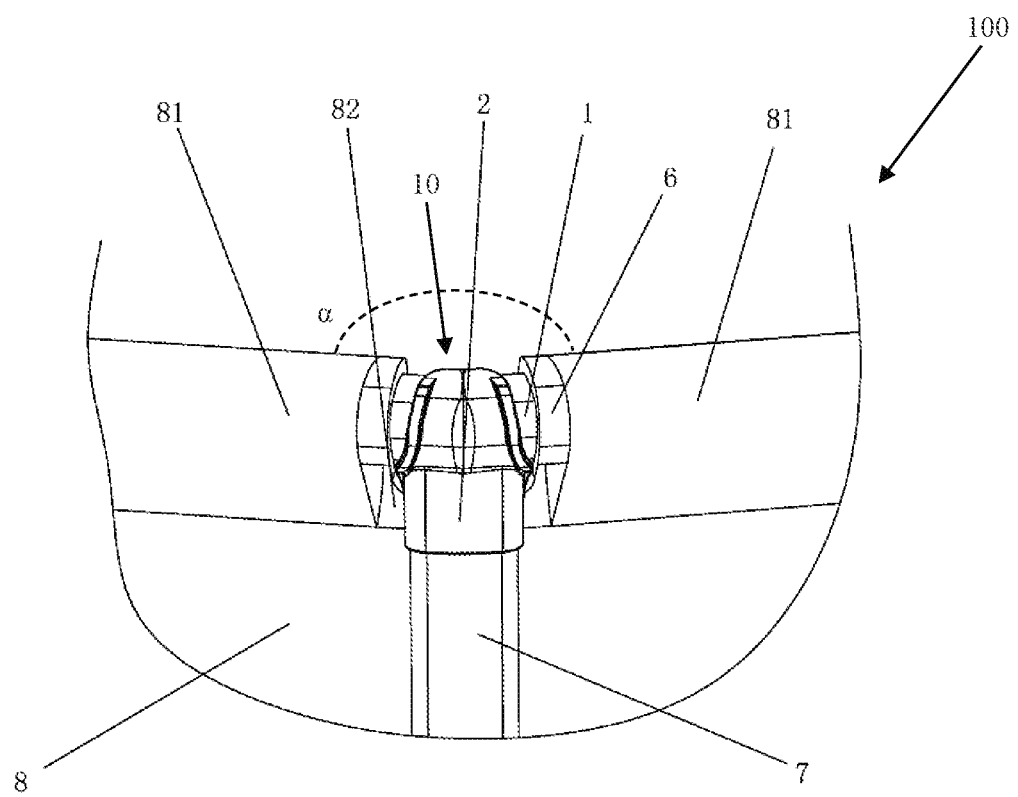
FIG. 1 is a partial perspective view of a frame pool including a frame assembly and a pool liner, the frame assembly including horizontal frame members and a vertical frame member coupled together via an exemplary T-shaped joint of the present disclosure.
Figure 2:
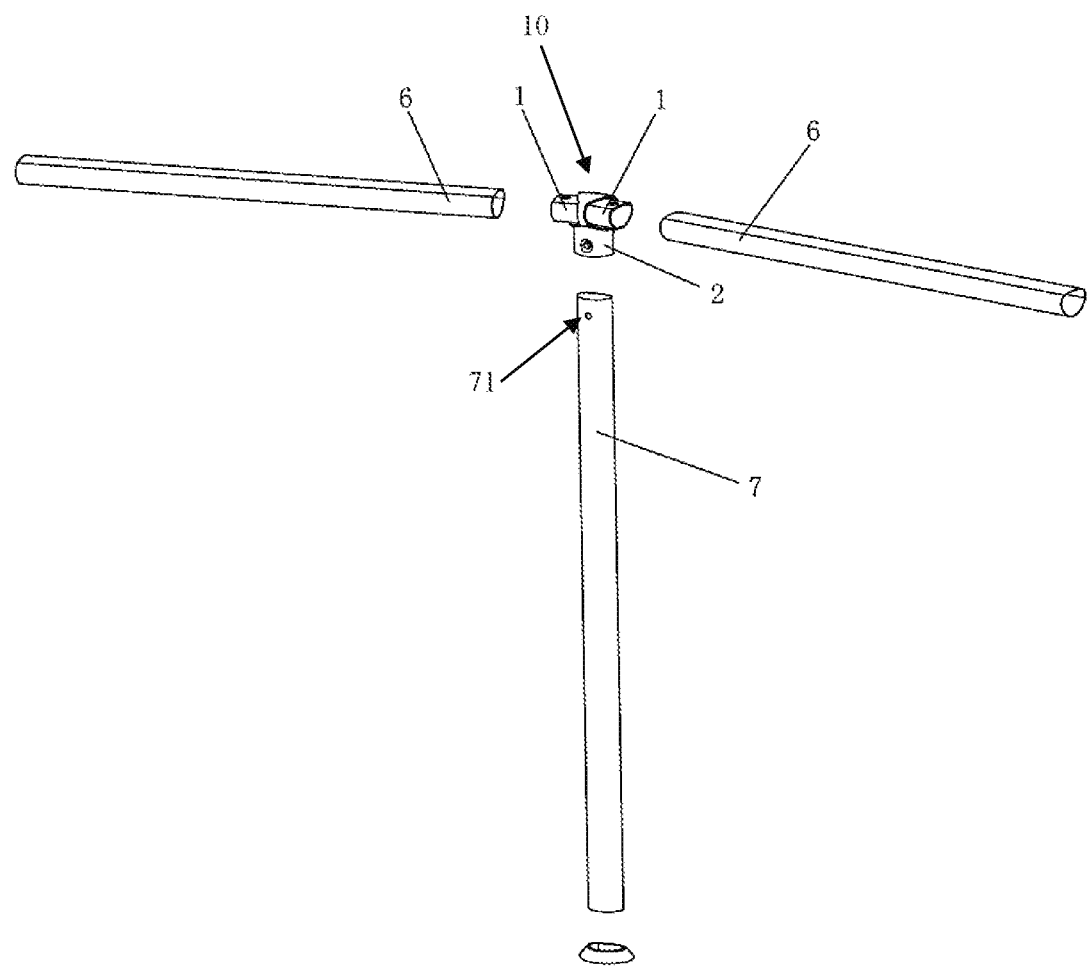
FIG. 2 is an exploded perspective view of the frame assembly of FIG. 1.

A portion of an exemplary frame pool 100 is shown in FIGS. 1 and 2. The illustrative portion of the frame pool 100 includes two adjacent horizontal frame members 6 (e.g., horizontal pipes) that cooperate to form an upper rim of the frame pool 100 and a vertical frame member 7 (e.g., vertical pipe) that extends downward from the horizontal frame members 6 to support the frame pool 100 on the ground. Although not shown in FIGS. 1 and 2, similar frame members 6 and 7 may be provided around the remaining perimeter of the frame pool 100. The frame pool 100 may vary in size and shape. For example, the frame pool 100 may be rectangular, circular, elliptical, or other suitable shapes.

Referring still to FIGS. 1 and 2, a T-shaped joint 10 may be used to removably couple the two adjacent horizontal frame members 6 to the adjacent vertical frame member 7. Although a single T-shaped joint 10 is shown in FIGS. 1 and 2, similar T-shaped joints 10 may be provided around the remaining perimeter of the frame pool 100. Each T-shaped joint 10 illustratively includes two horizontal joint portions 1 configured to couple to the horizontal frame members 6 and a vertical joint portion 2 configured to couple to the vertical frame member 7. To form the T-shape, the vertical joint portion 2 is centered between and perpendicular to the two horizontal joint portions 1. The orientation of the horizontal joint portions 1 determines the orientation of the adjacent horizontal frame members 6. In the illustrated embodiment of FIG. 1, for example, the horizontal joint portions 1 define an obtuse angle α therebetween, so the horizontal frame members 6 define the same angle α therebetween. In another embodiment, the horizontal joint portions 1 may be collinear with each other, so the horizontal frame members 6 would also be collinear with each other. In another embodiment, the horizontal joint portions 1 may be perpendicular to each other, so the horizontal frame members 6 would also be perpendicular to each other, such as along a corner of a rectangular frame pool 100.

Some or all components of the frame assembly, including the horizontal frame members 6, the vertical frame members 7, and/or the T-shaped joints 10, may be constructed of a polymer, specifically plastic, such as by injection molding. Compared to metallic components, the plastic components may be smooth and elastic to facilitate assembly and disassembly of the frame assembly. Also, the plastic components may be more resistant to galling and corrosion to promote extended use. With respect to the T-shaped joint 10, in particular, the horizontal joint portions 1 and the vertical joint portion 2 may be integrally formed as a single piece of plastic. Alternatively, the horizontal joint portions 1 and the vertical joint portion 2 may be formed as multiple pieces of plastic and then fixedly coupled (e.g., adhered, welded) together. The upper end of the T-shaped joint 10 may include a raised rim 22 (FIG. 3) to give the appearance that the vertical joint portion 2 wraps around the horizontal joint portions 1.

The illustrative frame pool 100 of FIG. 1 also includes a pool liner 8 supported by the frame members 6 and 7 to form an interior water cavity for swimming and/or bathing. The pool liner 8 may be wrapped and secured around the horizontal frame member 6 to form a loop or fold 81. The fold 81 of the pool liner 8 may also define a gap or hole 82 to expose the T-shaped joint 10, as described further below.

Figure 3:
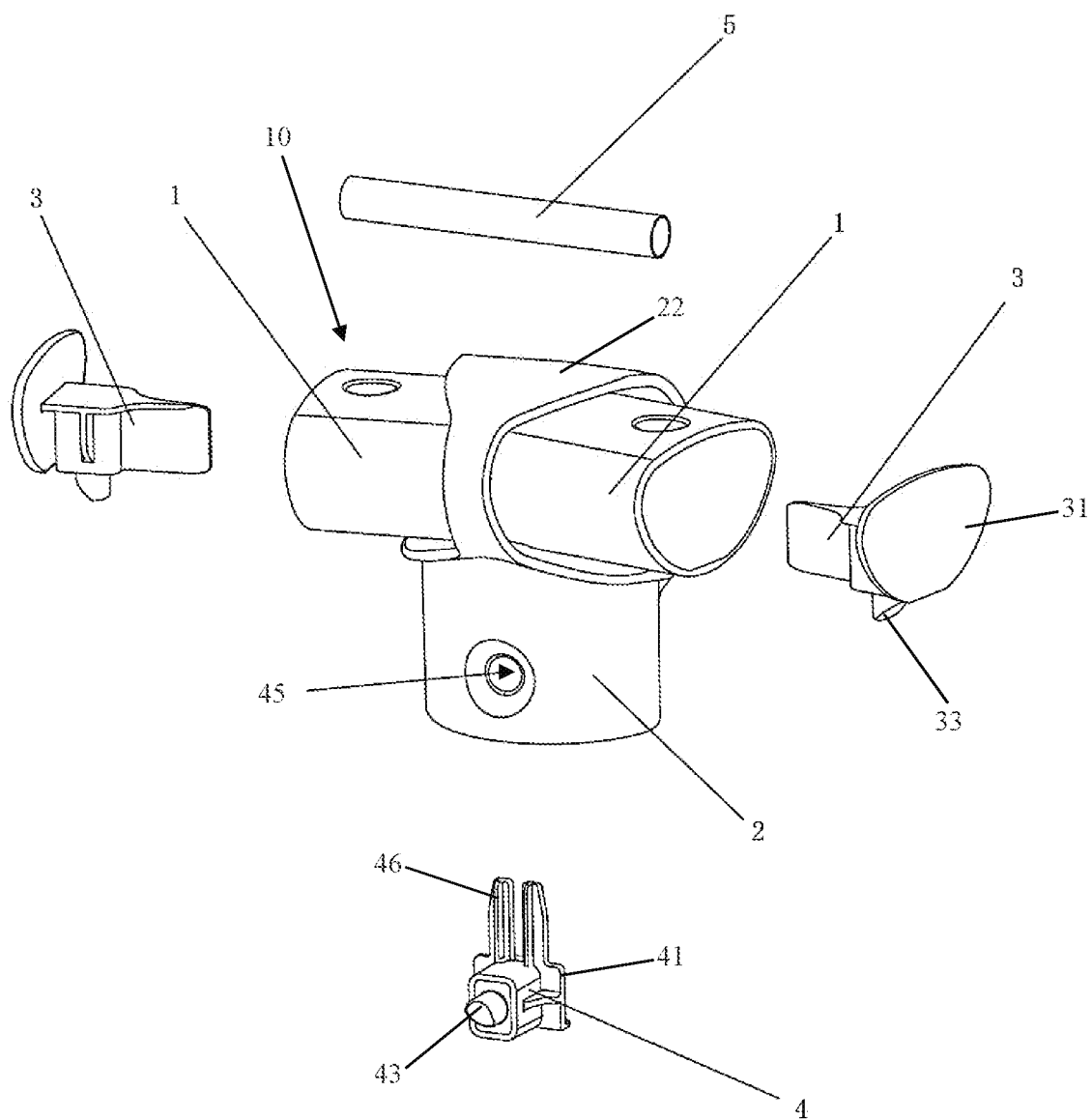
FIG. 3 is an exploded perspective view of the T-shaped joint of FIG. 1.

The illustrative T-shaped joint 10 is described in more detail with reference to FIGS. 3 and 4.

The horizontal joint portions 1 of the illustrative T-shaped joint 10 are configured to couple with the adjacent horizontal frame members 6 (FIG. 2). The horizontal joint portions 1 may be configured to fit within the adjacent horizontal frame members 6 in a sleeved manner. Thus, the external cross-section of the horizontal joint portions 1 may match the internal cross-section of the horizontal frame members 6. In the illustrated embodiment of FIG. 3, the external cross-section of the horizontal joint portions 1 is generally triangular with rounded edges to resist rotation between the horizontal joint portions 1 and the horizontal frame members 6. It is also within the scope of the present disclosure for the external cross-section to be circular, rectangular, elliptical, or another suitable shape to match the internal cross-section of the horizontal frame members 6.

Each horizontal joint portion 1 of the T-shaped joint 10 includes a coupling assembly 3 for removable attachment to the adjacent horizontal frame member 6 (FIG. 2). As shown in FIGS. 3 and 4, each coupling assembly 3 includes a base 31 received in the horizontal joint portion 1, a helical spring 32 held in place by the base 31, and a pin 33 extending radially outward (e.g., downward) through a hole 35 in the horizontal joint portion 1. Each horizontal joint portion 1 may include an internal horizontal reinforcing rib 11 and/or an internal horizontal support member 5 to help support base 31 within the T-shaped joint 10. In an assembled or locked state, spring 32 may bias pin 33 radially outward through hole 35 to engage a corresponding recess or hole (not shown) of the horizontal frame member 6 (FIG. 2). In a disassembled or unlocked state, a user may press pin 33 radially inward to compress spring 32 and disengage the horizontal frame member 6 (FIG. 2).

The vertical joint portion 2 of the illustrative T-shaped joint 10 is configured to couple with the adjacent vertical frame member 7 (FIG. 2). The vertical joint portion 2 may be configured to fit within the adjacent vertical frame member 7 in a sleeved manner. Thus, the external cross-section of the vertical joint portion 2 may match the internal cross-section of the vertical frame member 7. In the illustrated embodiment of FIG. 3, the external cross-section of the vertical joint portion 2 is generally triangular with rounded edges to resist rotation between the vertical joint portion 2 and the vertical frame member 7. It is also within the scope of the present disclosure for the external cross-section to be circular, rectangular, elliptical, or another suitable shape to match the internal cross-section of the vertical frame member 7.

The vertical joint portion 2 of the T-shaped joint 10 includes a coupling assembly 4 for removable attachment to the adjacent vertical frame member 7 (FIG. 2). As shown in FIGS. 3 and 4, each coupling assembly 4 includes a base 41 received in the vertical joint portion 2, a helical spring 42 held in place by the base 41, and a pin 43 extending radially outward (e.g., rearward) through a hole 45 in the vertical joint portion 2. The vertical joint portion 2 may include one or more internal vertical reinforcing ribs 21 to help support base 41 within the T-shaped joint 10, such as by compressing fingers 46 of base 41 together within the T-shaped joint 10. In an assembled or locked state, spring 42 may bias pin 43 radially outward through hole 45 to engage a corresponding recess or hole 71 of the vertical frame member 7 (FIG. 2). In a disassembled or unlocked state, a user may press pin 43 radially inward to compress spring 42 and disengage the hole 71 of the vertical frame member 7 (FIG. 2).

Figure 4:
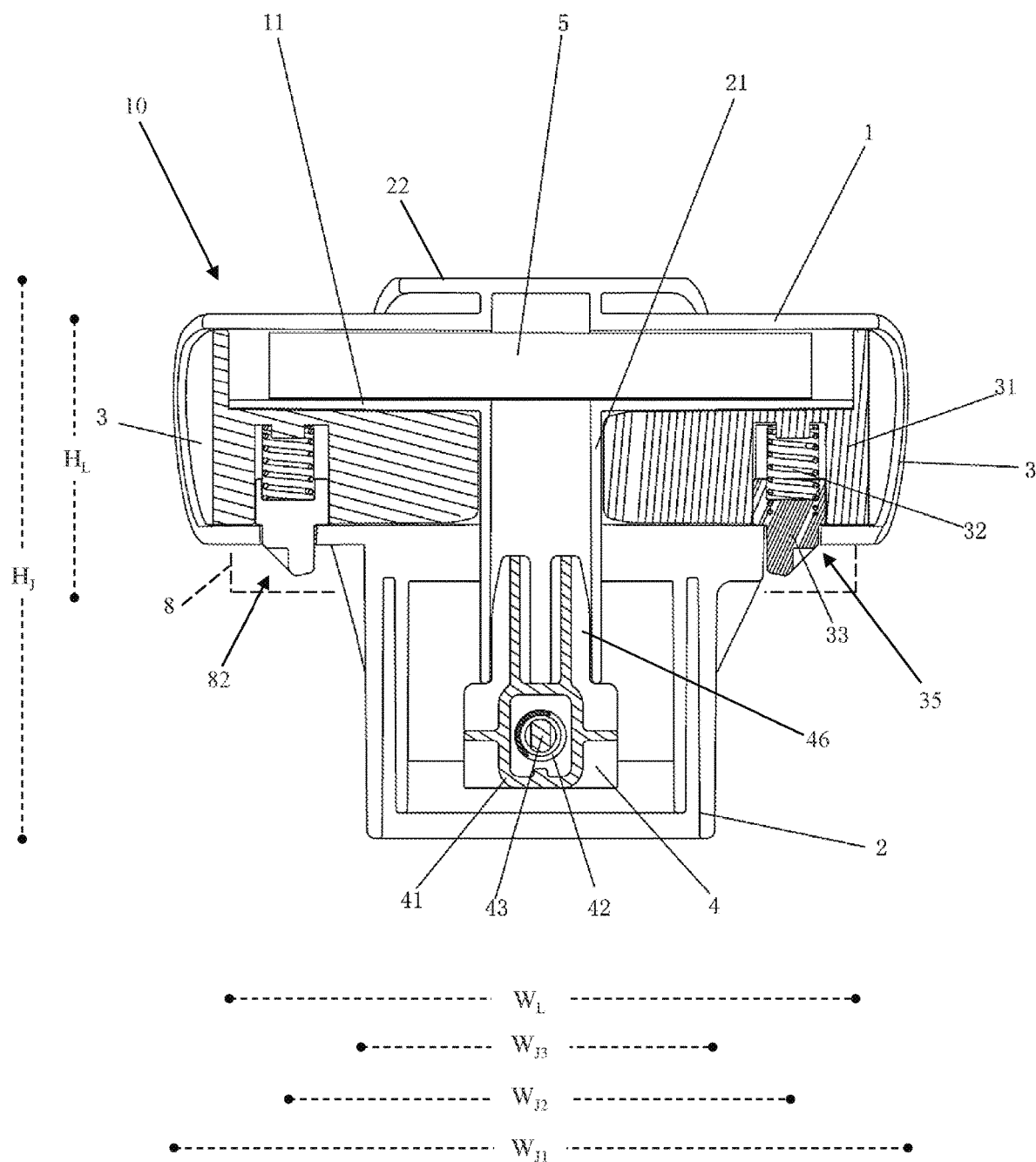
FIG. 4 is an assembled cross-sectional view of the T-shaped joint of FIG. 3.

According to an exemplary embodiment of the present disclosure, and as shown in FIG. 4, the size of the T-shaped joint 10 may be minimized such that the size of the corresponding hole 82 in the pool liner 8 (shown in phantom) may also be minimized. The small hole 82 in the pool liner 8 may improve the appearance and water containment of the frame pool 100 (FIG. 1) while still leaving the coupling assemblies 3 and 4, specifically the pins 33 and 43 of the coupling assemblies 3 and 4, accessible for subsequent disassembly.

The width of the T-shaped joint 10 may be minimized such that the width of the corresponding hole 82 in the pool liner 8 may also be minimized. For example, the total width $W_{J1}$ of the T-shaped joint 10 may be about 5 inches to about 7 inches, specifically about 5¾ inches, the width $W_{J2}$ between the pins 33 of the coupling assemblies 3 may be about 3 inches to about 5 inches, specifically about 3¹³⁄₁₆ inches, and the width $W_{J3}$ of the vertical joint portion 2 may be about 1 inches to about 3 inches, specifically about 2⅜ inches. In the illustrated embodiment of FIG. 4, the width $W_L$ of the hole 82 in the pool liner 8 is greater than both the width $W_{J3}$ of the vertical joint portion 2 and the width $W_{J2}$ between the pins 33 to expose the pins 33 of the coupling assemblies 3 for subsequent disassembly while being less than the total width $W_{J1}$ of the T-shaped joint 10. For example, the width $W_L$ of the hole 82 in the pool liner 8 is about 3 inches to about 7 inches, specifically about 4½ inches.

To help minimize the size of the T-shaped joint 10, the pins 33 of the coupling assemblies 3 may be positioned close to the vertical joint portion 2. Due to this close positioning, the width $W_{J3}$ of the vertical joint portion 2 may account for a majority of the width $W_{J2}$ between the pins 33 of the coupling assemblies 3. For example, the width $W_{J3}$ of the vertical joint portion 2 may account for 50%, 60%, 70%, 80%, or more of the width $W_{J2}$ between the pins 33 of the coupling assemblies 3. In the illustrated embodiment of FIG. 4, in particular, the width $W_{J3}$ of the vertical joint portion 2 accounts for about 70% of the width $W_{J2}$ between the pins 33 of the coupling assemblies 3. The width $W_{J3}$ of the vertical joint portion 2 may also account for a significant portion of the total width $W_{J1}$ of the T-shaped joint 10. For example, the width $W_{J3}$ of the vertical joint portion 2 may account for 40%, 50%, 60%, 70%, or more of the total width $W_{J1}$ of the T-shaped joint 10. In the illustrated embodiment of FIG. 4, in particular, the width $W_{J3}$ of the vertical joint portion 2 accounts for about 50% of the of the total width $W_{J1}$ of the T-shaped joint 10.

Additionally, the height of the T-shaped joint 10 may be minimized such that the height of the corresponding hole 82 in the pool liner 8 may be minimized. For example, the total height $H_J$ of the T-shaped joint 10 may be about 3 inches to about 5 inches, specifically about 3⅞ inches. Because the pin 43 of the coupling assembly 4 may be accessible in front of the pool liner 8 and behind the T-shaped joint 10, the hole 82 in the pool liner 8 need not extend downward beneath the pin 43. Thus, in the illustrated embodiment of FIG. 4, the height $H_L$ of the hole 82 in the pool liner 8 is less than the total height $H_J$ of the T-shaped joint 10 while still allowing access to the pin 33 of the coupling assembly 3 and the pin 43 of the coupling assembly 4 for subsequent disassembly.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A frame joint for an above ground pool frame having a first horizontal frame member, a second horizontal frame member, and a vertical frame member, the frame joint comprising:
   a first horizontal joint portion including a first coupling assembly including a pin configured engage a corresponding recess of the first horizontal frame member to couple with the first horizontal frame member;
   a second horizontal joint portion including a second coupling assembly including a pin configured engage a corresponding recess of the second horizontal frame member to couple with the second horizontal frame member;
   a vertical joint portion fixedly coupled to the first and second horizontal joint portions and configured to couple with the vertical frame member; and
   a liner positioned around the first and second horizontal frame members, the liner defining a hole that is sized to expose the first and second coupling assemblies;
   wherein a width of the vertical joint portion accounts for at least 50% of a width between the pins of the first and second coupling assemblies of the first and second horizontal joint portions.

2. The frame joint of claim 1, wherein the width of the vertical joint portion accounts for at least 40% of a total width of the frame joint.

3. The frame joint of claim 2, wherein the width of the vertical joint portion accounts for about 50% of the total width of the frame joint.

4. The frame joint of claim 1, wherein each of the first and second coupling assemblies further comprises a base and a helical spring supported by the base, the pin of each of the first and second coupling assemblies being biased outward through a hole in the respective horizontal joint portion by the helical spring to engage the corresponding recess of the respective horizontal frame member.

5. The frame joint of claim 1, wherein the width of the vertical joint portion accounts for about 70% of the width between the pins of the first and second coupling assemblies.

6. The frame joint of claim 1, wherein a width of the frame joint exceeds a width of the hole in the liner.

7. The frame joint of claim 1, wherein a height of the frame joint exceeds a height of the hole in the liner.

8. The frame joint of claim 1, wherein:
   the first horizontal joint portion is constructed of plastic;
   the second horizontal joint portion is constructed of plastic; and
   the vertical joint portion is being constructed of plastic.

9. The frame joint of claim 1, wherein the vertical joint portion is centered between the first and second horizontal joint portions to form a T-shaped frame joint.

10. The frame joint of claim 1, wherein the first and second horizontal joint portions cooperate to form an obtuse angle.

11. The frame joint of claim 1, wherein the vertical joint portion is integrally formed with the first and second horizontal joint portions as a single piece.

12. A method of assembling an above ground pool the method comprising:
   coupling a first horizontal joint portion of a frame joint to a first horizontal frame member with a first coupling assembly including a pin configured to engage a corresponding recess of the first horizontal frame member;
   coupling a second horizontal joint portion of the frame joint to a second horizontal frame member with a second coupling assembly including a pin configured to engage a corresponding recess of the second horizontal frame member;
   coupling a vertical joint portion of the frame joint to a vertical frame member; and
   positioning a liner around the first and second horizontal frame members with a hole exposing the first and second coupling assemblies;
   wherein a width of the vertical joint portion accounts for a majority of a width between the pins of the first and second coupling assemblies of the first and second horizontal joint portions.

13. The method of claim 12, wherein:
an external cross-section of the first horizontal joint portion matches an internal cross-section of the first horizontal frame member;
an external cross-section of the second horizontal joint portion matches an internal cross-section of the second horizontal frame member; and
an external cross-section of the vertical joint portion matches an internal cross-section of the vertical frame member.

14. The method of claim 12, wherein the first horizontal joint portion, the second horizontal joint portion, and the vertical joint portion are constructed of plastic.

15. The method of claim 12, wherein:
coupling the first horizontal joint portion to the first horizontal frame member comprises depressing the pin of the first coupling assembly into the first horizontal joint portion and releasing the pin into engagement with the first horizontal frame member; and
coupling the second horizontal joint portion to the second horizontal frame member comprises depressing the pin of the second coupling assembly into the second horizontal joint portion and releasing the pin into engagement with the second horizontal frame member.

16. The method of claim 12, wherein a width of the hole in the liner exceeds a width between the first and second coupling assemblies.

17. The method of claim 12, wherein the vertical joint portion of the frame joint is coupled to the vertical frame member with a third coupling assembly, and wherein a height of the hole in the liner is less than a distance between the first and third coupling assemblies.

18. The frame joint of claim 1, wherein the vertical joint portion includes at least one internal vertical reinforcing rib.

19. The frame joint of claim 1, wherein at least one of the first horizontal joint portion and the second horizontal joint portion includes an internal horizontal reinforcing rib.

20. The frame joint of claim 1, wherein at least one of the first horizontal joint portion and the second horizontal joint portion includes an internal horizontal support member.

21. A frame joint for an above ground pool frame having a first horizontal frame member, a second horizontal frame member, and a vertical frame member, the frame joint comprising:
a first horizontal joint portion including a first coupling assembly to couple with the first horizontal frame member;
a second horizontal joint portion including a second coupling assembly to couple with the second horizontal frame member;
a vertical joint portion fixedly coupled to the first and second horizontal joint portions and configured to couple with the vertical frame member; and
a liner positioned around the first and second horizontal frame members, the liner defining a hole that is sized to expose the first and second coupling assemblies;
wherein a width of the vertical joint portion accounts for at least 50% of a width between the first and second coupling assemblies of the first and second horizontal joint portions; and
wherein the first horizontal joint portion comprises a first external cross-section, the first external cross-section being generally triangular.

22. The frame joint of claim 21, wherein the first external cross-section comprises rounded edges.

23. A frame joint for an above ground pool frame having a first horizontal frame member, a second horizontal frame member, and a vertical frame member, the frame joint comprising:
a first horizontal joint portion including a first coupling assembly to couple with the first horizontal frame member;
a second horizontal joint portion including a second coupling assembly to couple with the second horizontal frame member;
a vertical joint portion fixedly coupled to the first and second horizontal joint portions and configured to couple with the vertical frame member; and
a liner positioned around the first and second horizontal frame members, the liner defining a hole that is sized to expose the first and second coupling assemblies;
wherein a width of the vertical joint portion accounts for at least 50% of a width between the first and second coupling assemblies of the first and second horizontal joint portions; and
wherein the vertical joint portion comprises a second external cross-section, the second external cross-section being generally triangular.

24. The frame joint of claim 23, wherein the second external cross-section comprises rounded edges.

25. The frame joint of claim 1, wherein the first and second coupling assemblies are accessible from an exterior side of the liner through the hole defined in the liner.

26. The frame joint of claim 1, wherein the first and second coupling assemblies are accessible from an exterior side of the liner through the hole defined in the liner and the first and second coupling assemblies are accessible from an interior side of the liner through the hole defined in the liner, the interior side of the liner being opposite the exterior side of the liner.

27. The frame joint of claim 1, wherein the hole of the liner simultaneously exposes the first coupling assembly and the second coupling assembly.

28. The frame joint of claim 1, wherein the hole of the liner exposes the first coupling assembly and the second coupling assembly in a resting position.

29. The frame joint of claim 1, wherein the first coupling assembly and the second coupling assembly are actuatable from an exterior of the frame joint along a vertical direction.

* * * * *

UNITED STATES PATENT AND TRADEMARK OFFICE
CERTIFICATE OF CORRECTION

PATENT NO. : 11,692,572 B2
APPLICATION NO. : 16/220484
DATED : July 4, 2023
INVENTOR(S) : Hua Hsiang Lin and Yaw Yuan Hsu It is certified that error appears in the above-identified patent and that said Letters Patent is hereby corrected as shown below:

In the Claims

Claims 1 and 8 should be amended to read as follows:

1. A frame joint for an above ground pool frame having a first horizontal frame member, a second horizontal frame member, and a vertical frame member, the frame joint comprising: a first horizontal joint portion including a first coupling assembly including a pin configured to engage a corresponding recess of the first horizontal frame member to couple with the first horizontal frame member; a second horizontal joint portion including a second coupling assembly including a pin configured to engage a corresponding recess of the second horizontal frame member to couple with the second horizontal frame member; a vertical joint portion fixedly coupled to the first and second horizontal joint portions and configured to couple with the vertical frame member; and a liner positioned around the first and second horizontal frame members, the liner defining a hole that is sized to expose the first and second coupling assemblies; wherein a width of the vertical joint portion accounts for at least 50% of a width between the pins of the first and second coupling assemblies of the first and second horizontal joint portions.

8. The frame joint of claim 1, wherein: the first horizontal joint portion is constructed of plastic; the second horizontal joint portion is constructed of plastic; and the vertical joint portion is constructed of plastic.

Signed and Sealed this
Eighth Day of August, 2023

Katherine Kelly Vidal
*Director of the United States Patent and Trademark Office*